Figure 1:
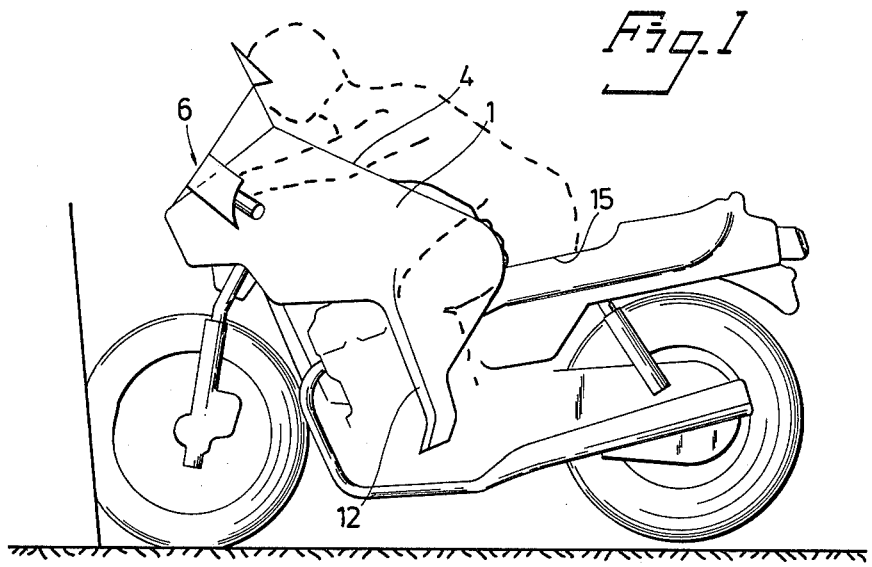

United States Patent [19]

Häggkvist

[11] 4,427,214
[45] Jan. 24, 1984

[54] PROTECTIVE DEVICE FOR MOTORCYCLES

[76] Inventor: Björn Häggkvist, 7 Siverts Väg, S-132 00 Saltsjö-Boo, Sweden

[21] Appl. No.: 283,230

[22] Filed: Jul. 14, 1981

[30] Foreign Application Priority Data

Jul. 14, 1980 [SE] Sweden .............................. 8005146

[51] Int. Cl.³ .................... B60R 21/04; B62J 17/02; B62J 27/00
[52] U.S. Cl. .................... 280/752; 74/551.3; 296/65 A; 296/189; 180/219
[58] Field of Search .............. 180/219, 218; 280/748, 280/751, 752; 296/65 A, 1 S, 189, 188; 74/551-551.8

[56] References Cited

U.S. PATENT DOCUMENTS 4,311,335 1/1982 Winiecki ............................ 296/188

FOREIGN PATENT DOCUMENTS 1269491 4/1972 United Kingdom ................ 280/751
1526191 9/1978 United Kingdom ................ 280/751

OTHER PUBLICATIONS

"Safety Motorcycle Combines Advanced Features" Automotive Engineering, Sep. 1979, pp. 82–83.

Primary Examiner—David M. Mitchell
Assistant Examiner—Timothy Roesch
Attorney, Agent, or Firm—Kinzer, Plyer, Dorn & McEachran

[57] ABSTRACT

An arrangement in or a structure for motorcycles intended to protect a motor cyclist against injury in the event of a collision comprises a protective body (1), having a cushioning or impact surface (4) which faces the upper part of the cyclists' body. The cushioning surface has an area of at least 500 cm², and is of such shape and so inclined that when the upper part of a motor cyclist's body lies against said surface, it forms an upwardly directed angle of at least 20° to the horizontal. That part of the protective body located nearest the motor cyclist is provided with support portions lying over the thighs and knees of the motor cyclist and the structure is secured to the motorcycle by attachment means which will break at a given load so as to free the structure from the motorcycle. The protective body (1) has at least one forward part (6) which forms a deformation zone, and means may be provided which, when the protective body moves relative to the motorcycle, act on the handle-bars in a manner which causes them to break loose.

4 Claims, 4 Drawing Figures

PROTECTIVE DEVICE FOR MOTORCYCLES

The present invention relates to an arrangement in motorcycles for protecting a motor cyclist against injury in the event of a collision, comprising a protective body mounted to the motorcycle in front of the drivers seat by means of attachment devices and extending forwards to at least the handle bars of said motorcycle, and having a cushioning surface which faces the upper part of the body of the motor cyclist, whereby the forward part of the protective body remote from the motor cyclist forms an energy-absorbing deformation zone.

One serious disadvantage with such an arrangement, which is described for example in British Patent Specification No. 1,269,491, is that in the event of a collision the motor cyclist is held firmly in the protective arrangement, for example by holding the legs locked. Another drawback is that the cushioning surface facing the motor cyclist is much too small to prevent injury to the upper part of the body, when the motor cyclist is thrown downwardly. Further, known protective arrangements of this kind are always based on the principle that material shall be deformed, in order for energy to be absorbed. It is possible to apply this principle in an automobile, in which the driver is held firmly in his seat by means of a safety harness, and in which the automobile has incorporated therein an energy absorbing system in the form of chassis plates, beams etc, which are intended to absorb so much energy as to prevent the steering wheel, engine etc. from being pushed back against the driver.

The aforementioned British Patent Specification No. 1,269,491 discloses a protective arrangement which is based on this principle, i.e. the collision forces are intended to be absorbed by the absorption of energy, with the motor cyclist locked to the motorcycle. In this known arrangement, the motor cyclist shall be prevented from sliding forwards and upwards, to which end there are provided separate wing members which cover the arms and which at low collision speeds assist in holding the motor cyclist to the motorcycle. In this known arrangement, the cushioning surface facing the upper part of the motor cyclist's body is substantially horizontal, and the thighs and knees are completely free. There is no possibility in such an arrangement of preventing the motor cyclist from sliding or being thrown forward, since the larger part of the mass of the motor cyclist lies approximately level with the upper part of the gasoline tank, which means that thighs and legs are automatically straightened out in the event of a collision, even at moderate speeds, whereat the motor cyclist is brought into contact with the object with which he has collided, with no protection whatsoever.

Consequently, a prime object of the invention is to provide a protective arrangement of the kind mentioned, in which the motor cyclist is prevented from being thrown from said protective arrangement, and in which the protective arrangement is broken loose from the motorcycle when subjected to a certain load.

To this end it is proposed in accordance with the invention that said cushioning surface is projected in a vertical plane and has an area of at least 500 cm$^2$, and is of such shape and so inclined that when the upper part of motor cyclist's body lies against said surface, it forms an upwardly directed angle of at least 20° with a horizontal plane; that the part of the protective body nearest the motor cyclist is provided with support portions lying over the thighs and knees of the motor cyclist; that attachment means are arranged to break at a given load; and that means are provided which, when the protective body moves relative to the motorcycle, act on the handle bars in a manner which causes then to break loose.

In the event of a collision, the motor cyclist will be urged against the cushioning or impact surface and the thigh and knee supports effectively prevent the legs from straightening, so that the motor cyclist remains held in the protective arrangement. The large cushioning surface will prevent serious injury to the upper part of the motor cyclist's body. Since the whole of the protective arrangement is constructed so as to break away from the motorcycle at a given load, the motor cyclist will be thrown away from his vehicle, with his head and upper body pressed against said cushioning surface. A substantial part of the collision energy is consumed prior to the protective arrangement breaking loose from the motorcycle, partly as a result of the deformation of the forward part of the protective arrangement, and partly as a result of the severance of the attachment means between the protective arrangement and the motorcycle, wherewith the motor cyclist is subjected to the least possible strain.

In accordance with one embodiment of the invention, there are provided guide means which impart to the protective arrangement as it breaks loose a direction of movement which is changed relative to the direction in which the motorcycle is moving, whereby in the event of a frontal collision with a car, the whole of the protective arrangement, together with the motor cyclist will pass over the car.

Figure 2:
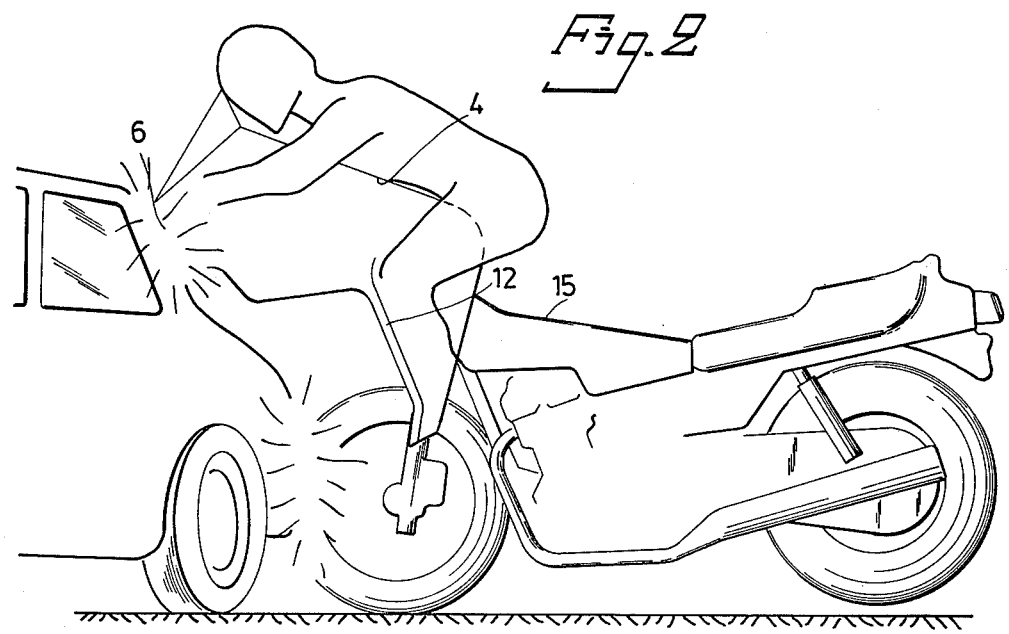
Figure 3:
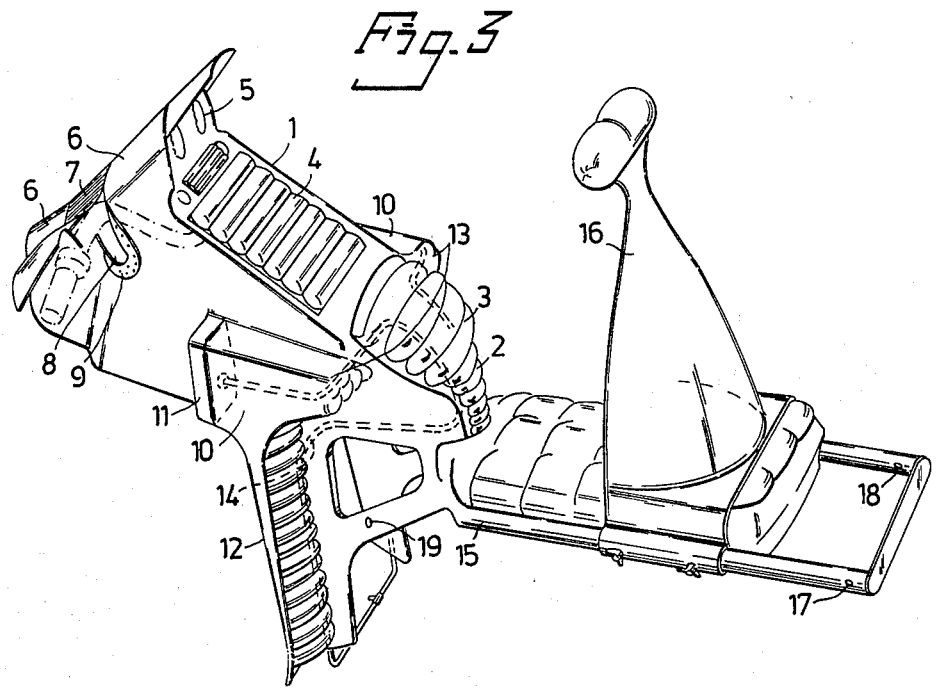
Figure 4:
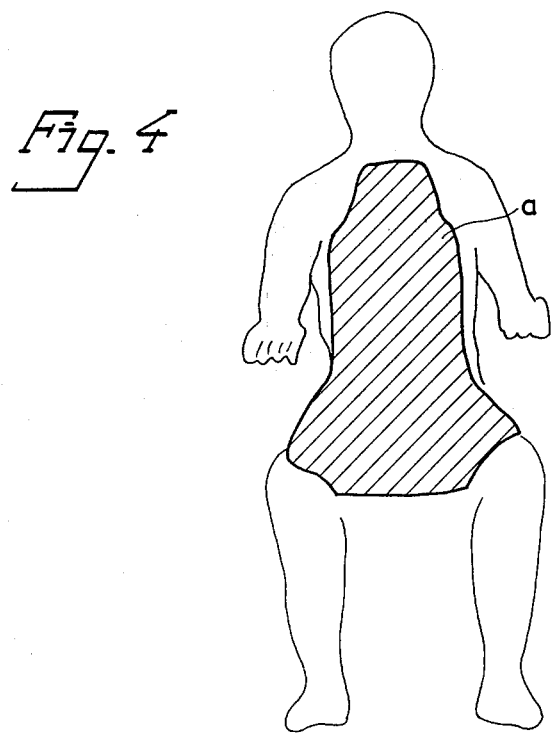

The invention will now be described in more detail with reference to the accompanying drawings, in which FIG. 1 illustrates a motorcycle provided with a protective arrangement according to the invention, said motorcycle being shown at the moment of a collision, FIG. 2 illustrates a collision situation in which the protective arrangement according to the invention has broken loose, together with the handle bars of the motorcycle, FIG. 3 is a perspective view of a protective arrangement according to the invention, and FIG. 4 illustrates the cushioning or impact surface of the protective arrangement, said surface projecting in a vertical plane.

As shown in the drawings, the protective arrangement according to the invention is located in front of the motor cyclist and attached to the motorcycle. On the side of the arrangement facing the motor cyclist there is provided a cushioning or impact surface 2,3,4 (FIG. 3) which projects in a vertical plane and conforms substantially to the upper part of the motor cyclist's body. As illustrated in FIG. 4, the cushioning surface has an area a of at least 500 cm$^2$.

It will be seen from FIG. 1 that in the event of a collision the motor cyclist is thrown forward, so that the upper part of his body lies against said surface. Since the force at which the motor cyclist meets the cushioning or impact surface is taken up over a relatively large area, the risk of serious injury to the motor cyclist as a result hereof is greatly reduced. When a collision takes place, the retardation forces will be absorbed in several stages, to wit:

(a) when the motor cyclist is forced against the cushioning surface, as shown in FIG. 1;

(b) when the protective arrangement is broken away from the motorcycle, and (c) when the protective arrangement, together with the motor cyclist, strike the colliding vehicle, as shown in FIG. 2, or reach the ground behind the colliding vehicle, in the case when means are provided for guiding the motor cyclist and the protective arrangement up over said vehicle.

This division of the various force-absorbing moments has been found particularly favourable, inter alia because the pressure against the upper part of the motor cyclist's body is momentarily eased or ceases in the interval between the moment at which the protective arrangement breaks away and the moment of hitting the ground or said vehicle. This in combination with the large cushioning surface greatly reduces the risk of rib fracture and internal injuries.

A preferred embodiment of the protective arrangement according to the invention is illustrated in FIG. 3. The arrangement comprises a fairing or shell structure 1 which is placed immediately in front of the driver's seat, so as to embrace the upper part and sides of the gasoline tank. The fairing 1 has a part 2 which lies against the motor cyclist's crotch and which is padded with a damping material, such as foam rubber. The major part of the protective arrangement extends upwardly and forwardly and the surface 4 thereof facing the motor cyclist is completely, or at least substantially, covered with an impact-absorbing material, such as foam rubber. In the illustrated embodiment, on the side of the fairing facing the crotch and stomach of the motor cyclist there is arranged an inflatable support section 3, which can be adapted to suit persons of differing heights and shapes. The illustrated embodiment has an openable flap 4, the outwardly facing side of which forms part of said cushioning surface, while beneath the flap there is found a small space. It should be mentioned here that the cushioning surface need not necessarily be padded, but is intended merely to take up the forces of body impact in the event of a collision.

The angle at which the surfaces 3 and 4 are inclined is such that when the upper part of the motor cyclist's body lies against the cushioning or impact surface 2,3,4, it forms an angle of 20° to the horizontal. Thus, in practice the surface 4 will form an upwardly directed angle of at least 20° to the horizontal, since it is, in the main, this surface which determines the angle at which the upper body part is inclined. The upper surface of the protective arrangement merges in front of the part surface 4 and over the handle-bars (shown in broken lines) with a more upwardly extending part, which in the illustrated embodiment forms an instrument panel 5, which is also covered with an impact-dampening material. The position of the panel 5 is such that when a motor cyclist of average height leans forwards his head will lie on, or closely adjacent, to said panel which thereby forms a head-protection in the event of a collision. The distance between the instrument panel and the normal position of the head of the motor cyclist can be adjusted by inflating the surface secton 3 to a greater or lesser extent.

As will be seen from FIG. 3, the protective arrangement according to the invention has a forward part 6, which forms a deformation zone. The part 6 includes a head lamp (not shown) and, as seen from the upper edge 5 of the instrument panel, is so inclined forwardly and downwardly and is so curved as to merge with a windscreen 7 mounted on the handle-bars, said windscreen being movable, together with said handle-bars, relative to the protective arrangement.

The deformation zone 6 is preferably constructed so that deformation thereof takes place over an extended period of time, and the function of the windscreen 7 is to protect the motor cyclist's hands, arms and shoulders against the slipstream. To this end, the protective arrangement surrounds part of the handle-bars (as shown) and is provided with elongate openings 8 through which the extremities of the handle-bars project. The rearward edge part of respective openings 8 is suitably reinforced. e.g. by means of a steel plate 9 or the like riveted to the fairing 1, which causes the handle-bars, in the event of a collision, to be subjected to such large forces from the protective arrangement that they are torn or broken loose, without causing damage to the protective arrangement as such.

In order to provide ample room for the thighs and knees of the motor cyclist, the arrangement includes the provision of cavities which lie in front of and above the knees. Each cavity is bounded by a curved surface 10, behind which a cooling device or radiator 11 may be arranged. The part surface 10 extends downwardly to form a shin guard 12, which is lined internally with a shock absorbing material, and which is made resilient so as to enable it to bend outwardly, so that it does not catch in the engine should the protective arrangement be torn loose from the motorcycle.

As will be seen from FIG. 3, the part surface 3 forms against the hips of the motor cyclist a wedge-shaped section 13. Extending through the section 13, the guard 12 and the crotch-supporting part 2 are lines 14 for cooling and heating media, such as oil and hot water. The downwardly facing surface of each wedge-shaped section 13 lies above the knees of the motor cyclist and part of the thighs. In this way the motor cyclist is held fast in the protective structure in the event of a collision, and prevented from being thrown out of or sliding over said structure.

In the illustrated embodiment, the protective structure is also provided with an extension 15 which forms the driving seat and which has mounted thereon a back rest 16, which is axially movable and lockable to permit adjustments to be made to the position thereof. The extension 15 and the back rest 16 are also constructed to constitute deformation zones.

It will be understood that the protective structure can be secured to a motorcycle by any means which are suitable for the purpose intended. In the illustrated embodiment these means have the form of bolts which are passed through holes 17,18,19 located in members associated with said structure, and which are designed to shear when subjected to a given minimum load in the event of a collision, to enable said structure to separate from the motorcycle and be thrown therefrom.

Although not shown, the protective arrangement also includes guide means, in the form of guide surfaces, linkage mechanisms or like mechanical devices, for guiding the forward part of the protective structure upwardly when said structure is separated from the motorcycle as a result of collision forces.

It will be understood that the invention is not restricted to the described and illustrated embodiment, which can be modified within the scope of the following claims. For example, the head lamp need not be mounted in the manner described, but can be fixed to the motorcycle in a conventional manner. Neither need the radiator 11 be arranged in the illustrated and described manner.

I claim:

1. An arrangement in motorcycles for protecting a motor cyclist against injury in the event of a collision, comprising a protective body (1) mounted to the motorcycle in front of the driving seat by means of attachment devices and extending forwards to at least the handle-bars of said motorcycle, and having a cushioning surface (2,3,4) which faces the upper part of the body of the motor cyclist, whereat the forward part (6) of the protective body remote from the motor cyclist forms an energy-absorbing deformation zone, characterized in that said cushioning surface (2,3,4) projects in a vertical plane and has an area of at least 500 $cm^2$, and is of such shape and so inclined that when the upper part of a motor cyclists' body lies against said surface, it forms an upwardly directed angle of at least 20° with a horizontal plane; that the part of the protective body nearest the motor cyclist is provided with support portions (13) lying over the thighs and knees of the motor cyclist; that the attachment means are arranged to break at a given load; and that means (9) are provided which, when the protective body (1) moves relative to the motorcycle, act on the handle-bars in a manner which causes them to break loose.

2. An arrangement according to claim 1, characterized in that the cushioning surface facing the upper part of the motor cyclists' body extends down to the saddle of said motor cycle.

3. An arrangement according to any one of claims 1-2, characterized in that the surfaces of the protective body (1) facing the motor cyclist are padded, either partially or completely, with an energy absorbing material.

4. An arrangement according to any one of claims 1-2, characterized in that the surfaces of the protective body which face the motor cyclist comprise totally or partially expandable, preferably inflatable sections.

* * * * *